Patented Sept. 8, 1931

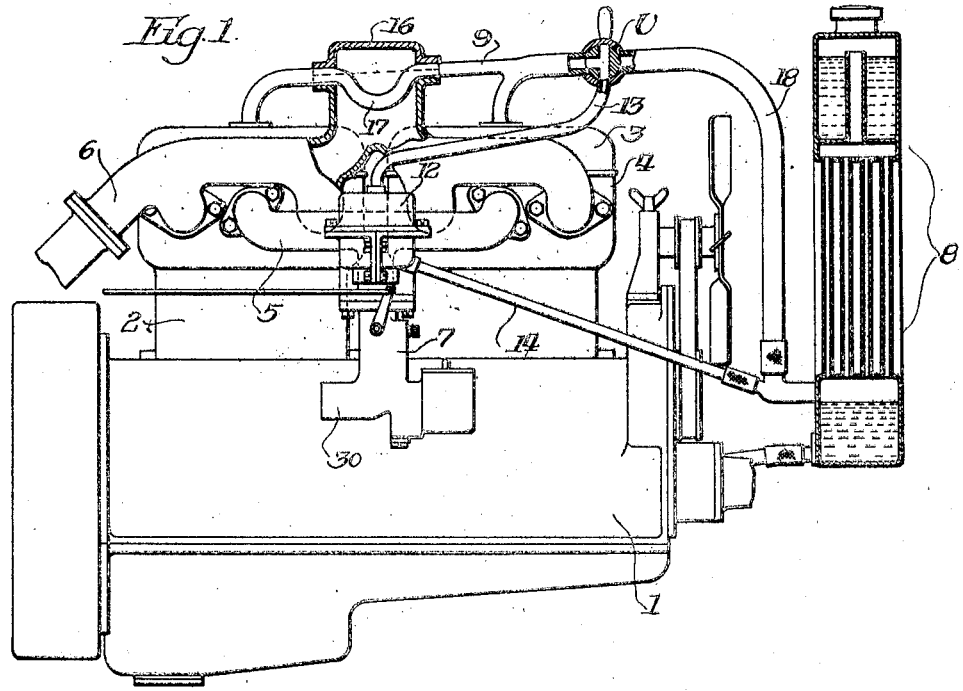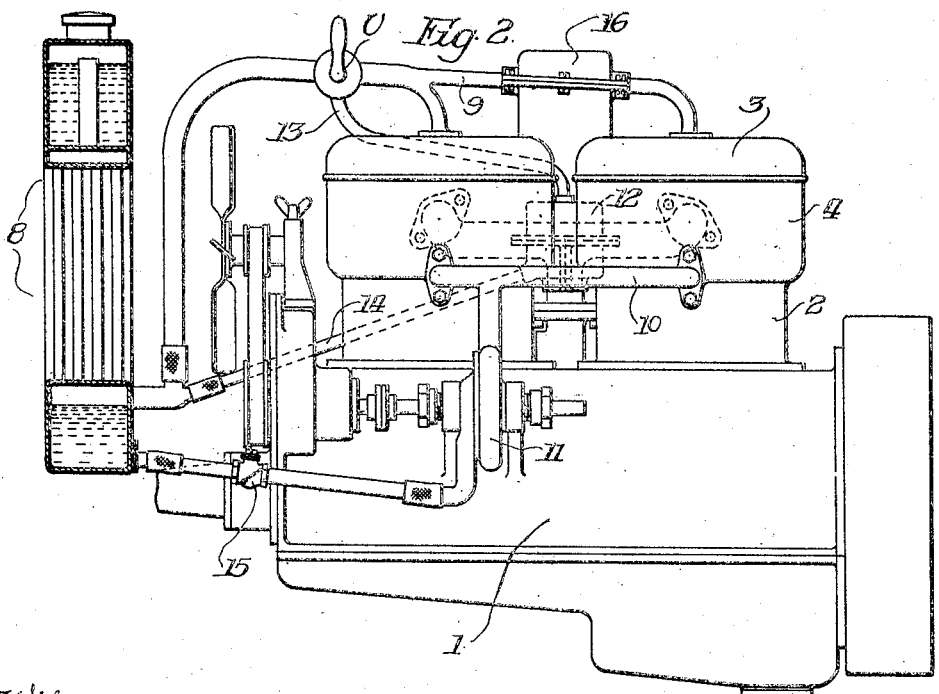

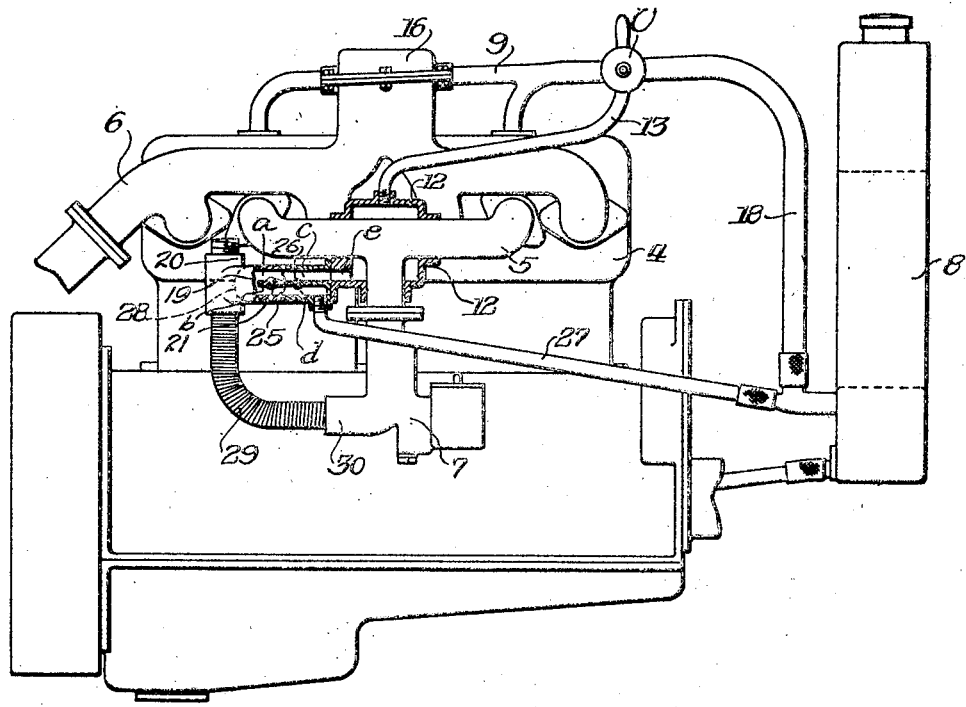
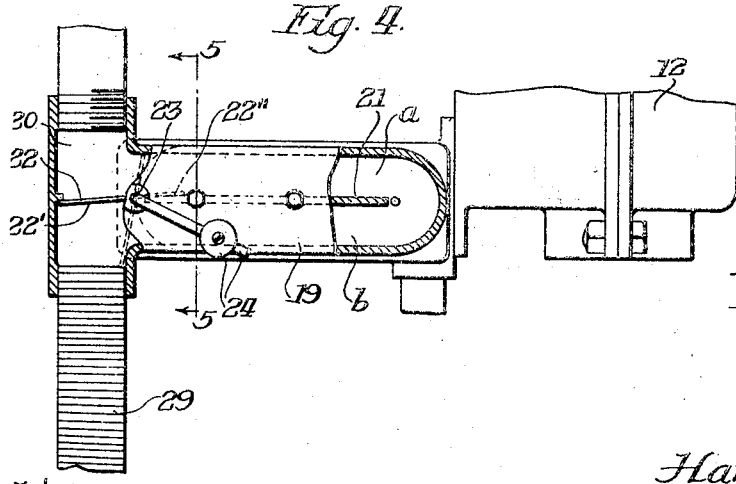
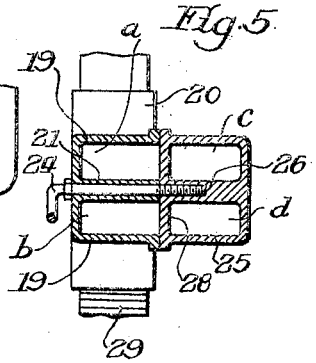

1,822,147

UNITED STATES PATENT OFFICE

HARRY L. HORNING, OF WAUKESHA, WISCONSIN, ASSIGNOR TO WAUKESHA MOTOR COMPANY, OF WAUKESHA, WISCONSIN, A CORPORATION OF WISCONSIN

INTAKE MIXTURE HEATING SYSTEM

Application filed May 19, 1926. Serial No. 110,129.

My invention relates to an improved heating system, particularly advantageous and efficient for heating the intake mixture before delivery to the cylinders of internal combustion engines. In accordance with my invention, I utilize for such heating the steam generated in the water jacket of the cylinder heads and around the combustion chambers. My invention can be, therefore, readily applied where steam cooling systems are provided for the engine.

In the heating of intake gases, uniformity of temperature is an important and desirable factor. The latent heat liberated during the condensation of steam is at a practically constant temperature, and although the temperature is moderate, it is sufficient to vaporize the liquid portions of the fuel, so that the fuel is in a vaporized condition or nearly so when entering the cylinders of the engine.

In steam cooling systems condensers receive the steam to condense it. In one application of my invention, a steam jacket surrounds the carbureter mixture outlet, or the engine intake pipe, or any other part of the mixture conducting apparatus, and such jacket is connected to receive the steam coming off the cylinder heads and combustion chambers, the latent heat driven off by the cooling of the steam and condensation thereof being taken on by the liquid portion of the intake mixture which is thereby well vaporized. Such cooling and condensation of the steam during heating of the intake mixture relieves the condensers of considerable work and the size of the condensers and their radiation areas can be materially reduced. Thus my improved system not only produces more reliable and efficient heating of intake mixture, but it also produces marked economy in condenser construction.

In another application of my invention the heat of the steam is used to temper the air supply for the intake mixture under the automatic control of the engine speed so that the intake mixture will be correspondingly tempered.

On the drawings:

Figure 1 is a side elevational view of the carbureter side of an engine;

Fig. 2 is an elevational view of the opposite side;

Fig. 3 is a side elevational view showing the arrangement for tempering both the intake mixture and the air supply therefore;

Fig. 4 is an enlarged front elevational view of the air tempering arrangement, and Fig. 5 is a sectional view on line 5—5 Fig. 4.

The engine shown comprises the crank case structure 1, the cylinder structure 2 and the cylinder head structure 3, the cylinder and cylinder head structure having the surrounding water jacket 4. The engine has the intake manifold 5 and the exhaust manifold 6, a carbureter structure 7 being connected with the intake manifold. The radiator or condenser 8 is provided for condensing and cooling fluid which flows to the water jacket. The outlet manifold 9 for the steam extends from the cylinder head cooling jacket while the inlet water manifold 10 communicates with the water jacket surrounding the cylinder structures. A pump 11 is interposed between the inlet manifold 10 and the lower part of the condenser and serves to pump water or other cooling fluid from the condenser into the cylinder structure surrounding jacket, and any steam generated will flow through the outlet manifold 9. In Figs. 1 and 2 I have shown a steam jacket 12 surrounding the juncture of the carbureter structure with the mixture intake manifold 5, it being understood, however, that such steam jacket could be applied around the carbureter mixture outlet or at any other desirable point along the path of the explosive fuel or its ingredients. The upper end of the steam jacket is shown connected by the pipe 13 and a three-way valve V with the end of the outlet manifold 9 so that steam may flow from the cylinder head jackets into the steam jacket. The steam in the steam jacket is partly or wholly condensed and gives up its latent heat to the fuel passing through the conduit surrounded by the steam jacket so that any unvaporized particles or fuel condensation will be more thoroughly vaporized before reaching the engine. The water of condensation or any uncondensed steam flows from the steam jacket through the pipe 14 into the water chamber of the condenser. Any uncondensed steam will then be condensed and the fluid will be cooled by the heat radiating system of the condenser. To prevent any backflow into the condenser through the pump on account of steam pressure within the jacket, a check valve 15 may be inserted between the condenser and the pump.

Where increased heat is desired for heating the intake gases, a section 16 of the exhaust manifold may surround or be otherwise associated with a section 17 of the steam outlet manifold 9, and with such arrangement the steam may be superheated to any degree desired.

At times, for example, when the engine is running at full load, it may not be desirable to pass all the generated steam through the steam jacket 12. By means of the valve V provided, the steam can be caused to flow either entirely through the steam jacket by way of pipe 13, or to flow directly back to the condenser through the pipe 18, or to flow partly through the steam jacket and partly directly back to the condenser.

In Figs. 3, 4 and 5, I show an arrangement in which the carbureter air supply is heated as well as the mixture delivered from the carbureter to the engine intake manifold, and such tempering of the air will assist materially in keeping the intake mixture at the proper temperature. In order that the air may be tempered in accordance with the speed of the engine, I utilize a device such as is shown in the copending application of Horning, Fisher & Pope, Serial No. 19,282, filed March 30, 1925, now Patent No. 1,638,581, issued Aug. 9, 1927. A device of this kind is shown in Fig. 4. Briefly describing it, it comprises the oblong shell or body 19 communicating at its outer end with the transversely extending air passageway 20, a partition 21 dividing said body into passageways $a$ and $b$ connected at one end and communicating at their other ends with passageway 20. A valve plate 22 is pivoted at the end of the partition on rod 23 and extends normally across the passageway 20 in which position it is yieldingly held by a weighted lever 24 extending from rod 23. When the valve is in its other extreme position, it will close the passageways $a$ and $b$ against the passageway 20 as shown by the dotted lines in Fig. 4. In the arrangement which I show for heating the intake air an extension 25 is provided on the steam jacket frame 12 and this extension has the longitudinal passageways $c$ and $d$, respectively, above and below the partition 26, the passageway $c$ communicating through the port $e$ with the interior of the steam jacket 12 while the passageway $d$ is connected by pipe 27 with the condenser. As shown in Figure 5, the body 19 of the air heater is applied against the front wall 28 of the extension 25 so that the passageways $a$ and $b$ are parallel with the passageways $c$ and $d$, the heat of the steam traversing the passageways $c$ and $d$, being thus conducted to the air flowing through the passageways $a$ and $b$ of the heater. The lower end of passageway 20 is shown connected by the tubing 29 with the carbureter intake end 30 the upper end of the passageway being open to the atmosphere. As before stated, the weighted lever 24 tends to keep the valve 22 in normal position across the passageway 20, and then air will flow into the passageway 20 and serially through the heated passageways $a$ and $b$, and through tube 29 to the carbureter air inlet, the tempered air mixing with the fuel delivered to the carbureter and the intake mixture being delivered to the engine intake manifold after having been further tempered by the steam flowing through the steam jacket 12. The valve 22 responds to the suction effect in the carbureter and also to the velocity of the air flowing through the passageway 20. When the engine is being started the throttle valve is entirely or very nearly closed so that there is very little suction in the passageway 20, and the valve 22 will remain across the passageway 20 so that all the air is heated before delivery to the carbureter. As the engine increases its speed by the wider opening of the throttle, more suction will be effective on the valve 22 which will then open to permit more or less of the incoming air to flow directly to the carbureter without being heated, and at full load of the engine the valve is entirely opened and only unheated air will flow to the carbureter, this being a condition desired in the operation of internal combustion engines.

In the arrangement shown, the steam from the cooling jacket of the engine flows first through the steam jacket 12 and then through the heater extension 25 from which it is conducted to the condenser. It is readily understood, however, that the steam could flow first through the heater extension 25 before passing through the steam jacket. If it is not desired to heat the air, then the heater can be removed from the extension 25.

Thus, by means of the steam jacket, a large quantity of heat, at a practically constant temperature, is available for heating the intake mixture to vaporize the liquid portion of the fuel, while, by means of the air tempering device, the temperature of the mixture will be more or less automatically kept adjusted to the various conditions of operation of the engine.

As changes and modifications are possible which would still come within the scope of my invention, I do not desire to be limited to precisely what I have shown and described.

I claim as follows:—

The combination with an internal combustion engine having a steam cooling jacket, and a carbureter having a mixture outlet connected with the engine inlet manifold, means utilizing the steam to heat the explosive mixture before it reaches the engine cylinder, an air path to the carbureter and subjected to the heat of the steam exclusively, a direct air path to the carbureter, and means controlled by the suction effect in said carbureter to proportion the amount of direct and heated air flowing to said carbureter.

In witness whereof, I hereunto subscribe my name this 15th day of May, 1926.

HARRY L. HORNING.